United States Patent Office 3,184,282
Patented May 18, 1965

---

3,184,282
SINGLE PAD THERMAL PROCESS FOR DYEING TEXTILE FIBERS
John Elton Cole, Jr., and William Henry Gumprecht, Wilmington, Del., assignors to E. I. du Pont de Nemours and Company, Wilmington, Del., a corporation of Delaware
No Drawing. Filed Apr. 11, 1963, Ser. No. 272,221
3 Claims. (Cl. 8—21)

This invention relates to compositions of matter useful as reactive dyes for materials possessing in their structure exchangeable hydrogen atoms. More particularly, this invention deals with dyes for textile fibers and similar organic materials (including paper, leather, plastic film, etc.) which possess in their molecules or micelles reactive radicals such as OH, NH or $NH_2$. Common illustrations of such materials are cellulosic fiber, wool, silk, nylon fiber and polyvinyl alcohol film.

It is an object of this invention to provide novel chemical compounds adapted for use as fiber-reactive dyes. Another object is to provide fiber-reactive dyes which are versatile in the sense that they can be applied to the fiber by various standard methods such as padding, exhaust and printing procedures. A further object is to provide fiber-reactive dyes which can be manufactured economically and which generally give rapid and high fixation on cellulosic fibers. Still another object is to provide fiber-reactive dyes which possess good build-up qualities and which produce dyeings that are fast to light and to washing. Other objects and achievements of this invention will appear as the description proceeds.

By rapid fixation in this application, we mean essentially complete fixation after 0.5 to one minute. (This quality is of interest primarily in padding procedures.) By high fixation, we mean that about 70 to 100% of the dye is chemically ponded to the fiber.

Reactive dyes constitute a type of dyes of relatively recent development. In these dyes, the dyeing capacity depends, not on physical affinity between the dye and fiber, but on direct chemical reaction (with formation of covalent bonds) between the dye and certain reactive radicals in the fiber. Such dyes generally have the form

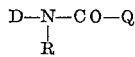

wherein D is the essential radical of a dye molecule, in other words, a radical containing a chromophoric group; Sol. is a solubilizing group, such as sulfo or carboxy; and Q is a reactive radical through which the dye molecule is reacted with the OH groups or NH or $NH_2$ groups of the fiber.

Heretofore, monochloro- and dichlorotriazine radicals have generally been used as reactive radicals, although others have been suggested or actually used.

Now, according to the present invention, new chemical compounds are produced which may be used as reactive dyes on fiber or other organic material as aforementioned, and satisfying to a high degree the aforenoted objects and improvements. The new chemical compounds may be expressed by the general formula $$D-\underset{\underset{R}{|}}{N}-CO-Q$$

where D is the radical of a water-soluble dye chromophore, particularly of an azo, metallized azo, acid-anthraquinone, or phthalocyanine coloring matter; R is hydrogen, a lower alkyl radical (say, 1 to 4 C-atoms) or a 2-hydroxyethyl, 2-cyanoethyl or 2-sulfotoethyl radical (free acid or water-soluble salt); and Q is the radical of a benzodiazine of the group consisting of quinoxalines and phthalazines bearing two halogen atoms in the heterocyclic ring and being attached to the CO group in the above formula in the benzo ring.

More partciularly, Q is a dihalogenobenzodiazine radical of the group defined by the formulas

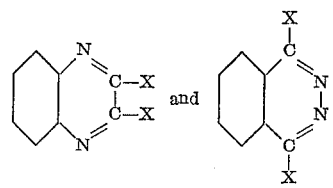

wherein each X individually designates Cl or Br.

The novel dye compounds of this invention are readily and economically prepared by reacting a water-soluble amino-dye compound of the formula D—NHR, wherein D and R have the same meaning as above, with a Bz-carbonyl halide of a benzodiazine compound as above defined, in other words, a compound of the formula Q—CO-hal., wherein hal. represents a halogen atom such Cl or Br while Q is a benzodiazine compound selected from the group above set forth. The reaction is achieved by bringing the two reactants together in aqueous solution at room temperature (or higher, if desired, up to say 95° C.), in the presence of an alkali-metal carbonate or other convenient acid-binding agent (NaOH, $Na_3PO_4$, pyridine, etc.) in sufficient quantity to drive the condensation forward at a reasonable rate. Customarily, a pH between 6 and 10 will answer this purpose. The reaction product is recovered by salting out and filtering, in the usual manner.

The requisite dihalogeno benzodiazine carbonyl halide itself may be prepared by the action of a phosphorus pentahalide or oxyhalide on the corresponding dihydroxybenzodiazine carboxylic acid. Dihalogeno benzodiazine carbonyl halides wherein the two X-atoms are unlike may be obtained in the same manner except using a mixture of phosphorus pentachloride and phosphorus pentabromide, for instance, or of phosphorus oxychloride and phosphorus oxybromide.

In the cases where D is an azo dye, other methods of synthesis are also available; for instance, (1) condensing the benzodiazine carbonyl halide with an azo-dye coupling component, and then coupling the condensed product to a diazotized arylamine or azoarylamine compound, (2) condensing the benzodiazine carbonyl halide, in equimolecular proportions, with an aryl diamine; diazotizing the resulting monoamine, and coupling to a coupling component; or (3) development of the dye on the fiber, after the latter has been reacted with a coupling or diazo component which carries a dihalogeno benzodiazine carbonyl radical.

The application of our novel dyes to organic material which possesses OH, NH or $NH_2$ groups is done fom aqueous solution, and may be effected by several procedures such as padding, exhaust, printing or (in the case of azo dyes) development on the fiber. All these procedures involve at one stage or another treatment of the fabric also with an aqueous alkali solution and heating. For instance, in padding, two separate baths may be employed, whereby the fabric is first padded in a dyebath then dried and padded in an alkaline bath; or the dye and alkali may be added to the same bath, whereby the fabric receives but a single padding treatment. The heating may involve steaming after the alkaline treatment, with or without an intermediate drying procedure; dry heating (as on a heated drum) after the alkaline treatment, with or without intermediate drying; application of the alkaline bath itself (in the presence of dye or following the dye padding) at elevated temperature (50° to 100° C.), or padding in alkali, squeezing and then heating the wet fabric. In printing procedures, the alkali is generally incorporated in the printing paste, and the printed fabric is dried and heated. In exhaust technique, the alkaline agent is generally entered into the dyebath after exhaustion of the dye on the fiber has been achieved, for instance, by adding salt (NaCl) to the dyebath.

Where the dye is developed on the fiber, the alkaline and heating treatments are applied to the fiber after impregnation with the component which carries the dihalo-benzodiazine-carbonyl radical, but before application of the further treatments necessary to develop an azo dye on the fiber.

The alkaline agents usable for the above purposes are of the same general class as normally used in dyeing with fiber-reactive dyes. Sodium carbonate and sodium hydroxide are the agents most commonly used, and the degree of alkalinity required is typified by a 2% aqueous solution thereof.

In forming the dyebath for padding or exhaustion, urea or other agents which assist in dissolving the color may be added. In some cases, a concentrated aqueous solution of the dye may be prepared first, which is then diluted to a bath of the desired strength, or, in the case of printing, is incorporated in the printing paste.

In all the above procedures, the novel dyes of the invention are found to give both rapid and high fixation, and the dyeings obtained are characterized by good fastness to light and to washing.

In the dyeing procedures, a reaction between dye and fiber is believed to take place as illustrated by the following typical equation.

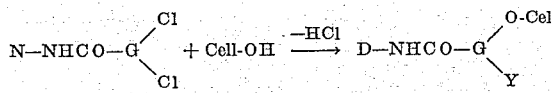

In this equation, Cell represents a cellulose radical, G represents a 5- or 6-benzodiazine radical of the group consisting of quinoxaline and phthalazine (which bears the Cl-atoms in the heterocyclic ring), while Y represents Cl, OH (resulting from hydrolysis) or another O-Cell radical.

The above modes of application and theory of reaction apply also to other fibers which have OH, NH or $NH_2$ radicals, but obviously high alkalinity or prolonged contact with alkali are to be avoided in the case of wool or other fibers which are sensitive to alkali.

On the other hand, the novel dyes of this invention are applicable to wool and nylon also by the ordinary dyeing procedures recognized for these fibers, that is from a hot, dilute acidic bath as is customary in the art of dyeing with acid dyes.

Without limiting this invention, the following examples are given to illustrate our preferred mode of operation. Parts mentioned are by weight.

PART I.—PREPARATION OF THE DIHALO-BENZODIAZINE CARBONYL HALIDES

Example 1.—2,3-dichloro-6-quinoxaline-carbonyl chloride 15 parts of 3,4-diaminobenzoic acid are added to 30 parts of 2B alcohol (95% ethanol) containing 9 parts of oxalic acid and 0.01 part of sulfuric acid. The resulting slurry is heated to reflux, held at reflux 12 to 15 hours, cooled and filtered. The filter cake, 2,3-dihydroxy-6-quinoxaline carboxylic acid, is washed with 10 parts of 2B alcohol, dried, and added to a mixture of 40 parts of phosphorus pentachloride and 30 parts of phosphorus oxychloride. The slurry is now heated to reflux, held at reflux for 3 to 4 hours, cooled, and poured into 200 to 300 parts of water which is maintained 25° to 35° C. by the addition of ice. The solid is filtered off, dried below 40° C., and recrystallized from 50 parts of cyclohexane, to yield 2,3-dichloro-6-quinoxaline-carbonyl chloride, of M.P. 112–113° C.

If the same procedure is carried out, except using 2,3-diaminobenzoic acid in lieu of the 3,4-diaminobenzoic acid above mentioned, 2,3-dichloro-5-quinoxaline-carbonyl chloride is obtained.

Example 2.—1,4-dichloro-6-phthalazine-carbonyl chloride

To 24.6 parts of trimellitic anhydride slurried in 100 parts of glacial acetic acid, is added at reflux temperature and over a one half hour period a solution of 5 parts of hydrazine hydrate in 30 parts of glacial acetic acid. The resulting slurry is refluxed 4 to 8 hours, cooled and filtered. The filter cake, 1,4-dihydroxy-6-phthalazine-carboxylic acid, is washed with 10 parts of glacial acetic acid, dried, and added to a mixture of 60 parts of phosphorus pentachloride and 15 parts of phosphorus oxychloride. The slurry is heated to reflux (110° to 120° C.), held for 3 to 4 hours at this temperature, cooled, and diluted with 70 parts of petroleum ether (B.P. 30° to 60° C.). The precipitated colorless solid is filtered, rinsed with 5 parts of ice-cold acetone, and dried to yield 1,4-dichloro-6-phthalazine-carbonyl chloride, of M.P. 130–132° C.

In like manner, if hemimellitic anhydride is used in lieu of the trimellitic anhydride in the above example, 1,4-dichloro-5-phthalazine-carbonyl chloride is obtained.

Example 3

By following the procedure of Example 1 or 2, except using a mixture of $PBr_5$ and $POBr_3$ in lieu of the mixture of $PCl_5$ and $POCl_3$ there indicated, the compounds 2,3-dibromo-6-quinoxaline carbonyl bromide and 1,4-dibromo-6-phthalazine carbonyl bromide, respectively, are obtained.

PART II.—PREPARATION OF FIBER-REACTIVE DYES

Throughout these examples and tables which accompany them, an arrow inserted between the names of two compounds stands for the words: *diazotized and coupled to.*

Example 1.—Azo dye 8.9 parts of the azo dye, 2-amino-4,8-naphthalene-disulfonic acid→3′-aminoacetanilide, are dissolved in 250 parts of water. After adjusting the pH (by the aid of sodium bicarbonate) to about 8 and the temperature to 35° C., 5.0 parts of 2,3-dichloro-6-quinoxaline-carbonyl chloride (prepared as in Example 1, above) are added. The mixture is stirred overnight at the above temperature and pH, then salted with 12 parts of sodium chloride, whereupon the precipitate formed is filtered off, washed with an aqueous (5%) NaCl solution and dried in a vacuum at a temperature below 60° C.

The light-yellow product obtained corresponds to the formula

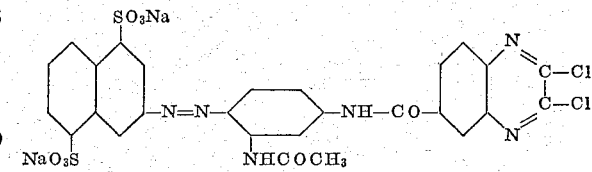

When this dye is applied to cotton fabric by the procedure of Example A to C below, a bright yellow dyeing is obtained that exhibits excellent fastness to light, washing and acid perspiration, and has good bleach fastness.

A dye of similar shade and dyeing qualities is obtained if the quinoxaline compound above named is replaced by an equal weight of 1,4-dichloro-6-phthalazine-carbonyl chloride, prepared as in Example 2, above.

Dyes of similar high fastness qualities and of shades as indicated below are obtained by condensing the one or the other of the above named diazine carbonyl chloride compounds, according to the procedure of the above example, with any one of the following aminoazo dyes:

TABLE I

| Item No. | Aminoazo dye | Shade on cotton |
|---|---|---|
| 1 | 8-amino-1,3,6-naphthalene-trisulfonic acid ⟶ aniline. | Yellow. |
| 2 | 8-amino-1,3,6-naphthalene-trisulfonic acid ⟶ 3′-aminoacetanilide. | Do. |
| 3 | Orthanilic acid ⟶ 6-amino-1-naphthol-3-sulfonic acid. | Orange. |
| 4 | 2-amino-p-benzenedisulfonic acid, diazotized and coupled to: | |
|   | (a) 6-amino-1-naphthol-3-sulfonic acid. | Do. |
|   | (b) 8-amino-1-naphthol-3,6-disulfonic acid. | Red. |
| 5 | 2-amino-4-methoxybenzene-sulfonic acid ⟶ 6-amino-1-naphthol-3-sulfonic acid. | Orange. |
| 6 | 1-(4′-aminophenylazo)-2-naphthyl-amine-2′,3,6-trisulfonic acid. | Do. |
| 7 | Orthanilic acid ⟶ 8-amino-1-naphthol-3,6-disulfonic acid. | Red. |
| 8 | 2-amino-4-methylbenzene-sulfonic acid ⟶ 8-amino-1-naphthol-3,6-disulfonic acid. | Do. |
| 9 | 3-amino-5-methylbenzene-sulfonic acid ⟶ 8-amino-1-naphthol-3,6-disulfonic acid. | Do. |
| 10 | 3-amino-2,7-naphthalene-disulfonic acid ⟶ 8-amino-1-naphthol-3,6-disulfonic acid. | Do. |
| 11 | 1-(4′-aminophenylazo)-2-naphthyl-amine-2′,3,6-trisulfonic acid, diazotized and coupled to: | |
|   | (a) Aniline. | Violet. |
|   | (b) m-Toluidine. | Do. |

(The amino-monoazo compound named in items 6 and 11 above is obtained by reduction of the corresponding 4′-nitrophenylazo compound, as described more fully in copending application of W. H. Gumprecht and D. J. Reif, Serial No. 830,733, filed July 31, 1959.)

The procedural details of the above example may likewise be varied considerably. For instance the volume of water used is not critical. In lieu of sodium bicarbonate, sodium hydroxide, trisodium phosphate and the like may be used to control the pH, and the latter may be kept at a value between 6 and 10. The condensation temperature may vary from 5° to 85° C., and the reaction time from 1 to 50 hours. The quantity of electrolyte used to salt out the product is likewise not critical.

*Example II.—Azo dye*

30 parts of the amino-azo dye

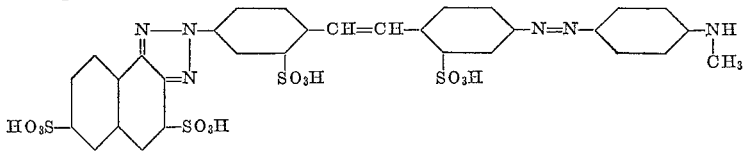

are dissolved at 40° C. in 600 parts of water. The red solution is cooled to 16° C., the pH is adjusted with sodium bicarbonate to about 7.5 to 8.0, and 10 parts of 1,4-dichloro-6-phthalazine-carbonyl chloride dissolved in 120 parts of acetone are added. The resulting slurry is maintained at 10° to 20° for 3 hours, while the pH is maintained between 7 and 8 by the addition of an aqueous solution of sodium bicarbonate. The resulting yellow dye is salted from solution by the addition of 200 parts of saturated aqueous sodium chloride, filtered off, washed with 4 parts of sodium chloride in 80 parts of water, and dried below 70° C. in vacuum desiccator. The product, is a sodium salt which in its free acid form corresponds to the formula

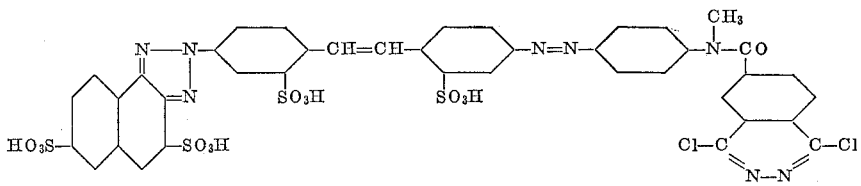

dissolves in water to give a yellow solution.

When applied to cotton fabric by any of the procedures A to C hereinbelow, a bright yellow dyeing is obtained, which exhibits excellent fastness to light, washing, bleach, and acid perspiration.

The initial azo dye used in this procedure is itself a novel compound and comes within the scope of the claims of copending application of R. E. Starn, Jr. and W. H. Gumprecht, Serial No. 800,931, filed March 23, 1959, now U.S. Patent No. 3,117,958. It may be prepared by procedure analogous to that set forth in Example 1 of said application, and which is, in brief outline, as follows:

4-amino-4′-nitrostilbene-2,2′-disulfonic acid is diazotized and coupled to 2-naphthylamine-3,6-disulfonic acid, and the resulting solution is oxidized with alkaline sodium hypochlorite to form the naphtho-triazole compound. After recovery of the latter by salting out and filtration, it is redissolved in water at pH 4 (using acetic acid) and reduced with iron filings at 100° C. After filtering, the solution of the resulting 4′-amino compound is diazotized, coupled in acid medium to N-methyl-aniline, and salted.

A dye of similar shade and good dyeing qualities is obtained if the procedure of this example is repeated except using as diazine reagent 2,3-dichloro-6-quinoxaline-carbonyl chloride.

Dyes of similar high fastness qualities and of shades as indicated below are also obtained by the same procedures as in this example, except for replacing the aminoazo dye there named by the stoichiometrically equivalent quantity of any of the aminoazo dyes listed in the following Table II:

TABLE II

| Item No. | Aminoazo dye | Shade on cotton |
|---|---|---|
| 1 | 3-amino-1,5-naphthalene-disulfonic acid ⟶ N-methyl-m-toluidine. | Yellow |
| 2 | 3-amino-1,5-naphthalene-disulfonic acid ⟶ N-methyl-2,5-dimethoxy-aniline. | Orange |
| 3 | 4-amino-2,7-naphthalene-disulfonic acid, diazotized and coupled to: | |
|   | (a) N-methylaniline. | Yellow |
|   | (b) N-(2-hydroxyethyl)aniline. | Do. |
|   | (c) N-(2-cyanoethyl)aniline. | Do. |
|   | (d) N-(2-sulfatoethyl)aniline (Na salt or free acid). | Do. |
| 4 | 1-(4′-aminophenylazo)-2-naphthyl-amine-2′,3,6-trisulfonic acid, diazotized and coupled to: | |
|   | (a) N-n-butylaniline. | Violet |
|   | (b) N-methyl-m-toluidine. | Do. |

*Example III.—Azo dye. Alternate process. Condensing the carbonyl halide with the coupling component*

(a) *Preparation of solution of coupling component.*—31.9 parts of 8-amino-1-naphthol-3,6-disulfonic acid are dissolved in 2000 parts of water, followed by addition of 15 parts of sodium formate. 26.2 parts of 2,3-dichloro-6-quinoxaline-carbonyl chloride are then added at 20° to 25° C. and pH 4.5 to 5.2 (held constant by the addition of 2 N sodium carbonate) over a period of 4 hours. The condensation mass is stirred overnight at 20° to 25° C. and pH 4.5 to 5.0, then warmed to 50° C., and filtered. The filtrate is salted with 300 parts of sodium chloride, cooled to 18° C. and filtered. The resulting green-brown filter cake is slurried at room temperature in 2000 parts of water, the pH is adjusted to 7.0 by addition of sodium bicarbonate, and 60 parts of sodium bicarbonate are added.

(b) *Preparation of the diazo solution and coupling.*—
25.3 parts of 2-amino-p-benzenedisulfonic acid in 600 parts of water are diazotized with sodium nitrite in the presence of HCl in the usual manner. The pH of the diazo solution is adjusted to 4.9 by addition of 2 N sodium carbonate, and the mass is then stirred into the above solution of coupling component, over a period of one hour. The resulting red solution is salted by adding 450 parts of sodium chloride. The red precipitate is filtered off, washed with 50 parts of a 15% sodium chloride solution, and dried.

The color obtained is a sodium salt of the compound defined by the formula:

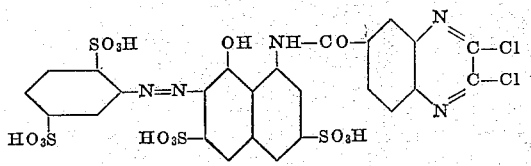

and when applied to cotton by the procedures of Examples A and C below, gives bright red dyeings which possess excellent fastness to light and washing, and good acid perspiration fastness.

(c) If 17.3 parts of orthanilic acid are used in place of the 25.3 parts of 2-amino-p-benzenedisulfonic acid in part (b) above, a sodium salt of the compound defined by the formula

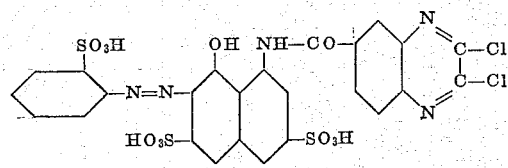

is obtained. This compound is of red-orange shade, and when applied to cotton by the procedures of Examples A to C below, it gives bright red dyeings of excellent fastness to light, washing and acid perspiration.

A dye of similar properties is obtained when 8-amino-1-naphthol-3,6-disulfonic acid is condensed as above with 1,4-dichloro-6-phthalazine-carbonyl chloride, and then coupled to diazotized orthanilic acid.

Other fiber-reactive dyes of high fastness qualities and of the shades indicated below may be obtained in a similar manner by condensing 2,3-dichloro-6-quinoxaline-carbonyl chloride with the coupling components listed below, and then coupling to the diazotized amines tabulated.

TABLE III

| Item No. | Coupling component | Diazo component | Shade on cotton |
|---|---|---|---|
| 1 | 8-amino-1-naphthol-3,6-disulfonic acid | 2-amino-4-methyl-benzenesulfonic acid | Red. |
| 2 | ___do___ | 2-amino-4-methoxy-benzenesulfonic acid | Do. |
| 3 | ___do___ | 2-acetamido-4-amino-benzenesulfonic acid | Blue-red. |
| 4 | ___do___ | Metanilic acid | Red |
| 5 | ___do___ | 3-amino-2,7-naphthalene-disulfonic acid | Do. |
| 6 | 6-amino-1-naphthol-3-sulfonic acid | Orthanilic acid | Orange |
| 7 | ___do___ | Metanilic acid | Do. |
| 8 | ___do___ | Sulfanilic acid | Red-orange. |

*Example IV.—Azo dye. Developed on the fiber*

A 4% solution of the green-brown coupling component, prepared from the filter cake obtained in the first step of Example III, is padded on cotton fabric at 50% pick-up. The fabric is dried, padded at 50% pick-up with a 1.5% aqueous solution of sodium carbonate, steamed for 30 seconds, and rinsed. The treated fiber is then immersed in a cold diazo solution of 2-amino-p-benzene-disulfonic acid (prepared in known manner from the amine, HCl and NaNO₂), containing sufficient alkali to effect coupling with the coupler applied to the fiber. The latter is then scoured, rinsed and dried. A red dyeing is obtained, identical in shade and fastness with that obtained by the dye of Example III(b).

If the diazo compound in the above coupling bath is replaced by the diazo compound of any of the following amines, dyeings of the shades indicated below and of good fastness qualities are obtained.

TABLE IV

| Diazo component | Shade on fiber |
|---|---|
| 4-amino-2-methylbenzene-sulfonic acid | Blue-red. |
| 4-amino-3-methylbenzene-sulfonic acid | Do. |
| 2-amino-3,6-naphthalene-disulfonic acid | Maroon. |
| 2,5-dimethoxyaniline | Blue-purple. |
| 2-methoxy-5-methylaniline | Purple. |
| 4-methoxy-2-nitroaniline | Brown. |
| 2-methoxy-4-nitroaniline | Purple. |
| o-Anisidine | Maroon. |
| p-Anisidine | Do. |
| 3-amino-4-methoxybenzene-sulfonic acid | Do. |
| p-Nitroaniline | Do. |
| Orthanilic acid | Red. |
| 2,4-dichloroaniline | Do. |

*Example V.—Azo dyes. Alternate process. Condensing the carbonyl halide with the component to be diazotized*

*Preparation of the diazo solution.*—3.6 parts of 2,4-diamino-benzenesulfonic acid are dissolved in 100 parts of water. 5 parts of 2,3-dichloro-6-quinoxaline-carbonyl chloride are then added at 20° to 25° C. and pH 7 to 8 over a period of 4 hours. The resulting solution is cooled to 5° C., and the pH is adjusted to 5.2 by addition of 2 N hydrochloric acid. The condensation product thus obtained is diazotized in the usual manner with hydrochloric acid and sodium nitrite, at 5° to 10° C. After stirring for 1 hour at 5° to 10° C., the excess nitrite is destroyed. The pH is then adjusted to 5.1 with an aqueous solution of sodium bicarbonate.

*Preparation of coupling component and coupling step.*—5.4 parts of 6-acetamido-1-naphthol-3-sulfonic acid are dissolved in 100 parts of water. The pH of the solution is adjusted to 7.2 with a solution of sodium bicarbonate, followed by the addition of 4 parts of sodium bicarbonate. The above mentioned diazo solution is stirred into the solution of coupling component, at room temperature, to give a bright orange colored solution. Upon addition of sodium chloride (sufficient to form a 15% salt solution) an orange precipitate is obtained, which is filtered off, washed with 20 parts of 10% sodium chloride solution, and dried. The product corresponds to the formula

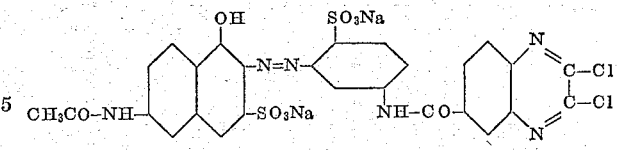

When applied to cotton by any of the procedures A to C below, it produces bright orange dyeings which exhibit excellent fastness to light and to washing.

If the above procedure is repeated except that the 2,4-diaminobenzene-sulfonic acid is replaced by 3.6 parts of 2,5-diaminobenzene-sulfonic acid, the quinoxaline-carbonyl chloride is replaced by 5 parts of 1,4-dichloro-6-phthalazine-carbonyl chloride and the condensation of these two compounds is performed in 150 parts of water, a dye of the following formula is obtained:

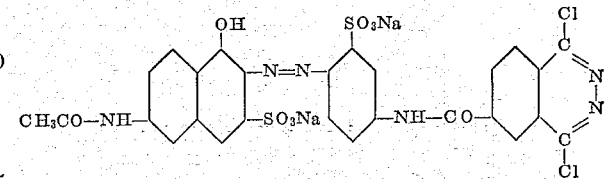

When applied to cellulosic fiber by the above alluded to fiber-reactive procedures, this dye gives bright scarlet dyeings having excellent fastness to light, washing and acid perspiration tests.

In a similar manner, dyes of the shades indicated below and of excellent fastness properties may be produced by using, in the procedure set forth hereinabove, the following diamines and coupling components

TABLE V

| Item No. | Diamine | Coupling component | Shade on cotton |
|---|---|---|---|
| 1 | 2,4-diaminobenzene-sulfonic acid. | 1-(2-chloro-5-sulfo-phenyl)-3-methyl-5-pyrazolone. | Yellow |
| 2 | ----do---- | 3-methyl-1-(2,4-disulfo-phenyl)-5-pyrazolone. | Do. |
| 3 | ----do---- | 1-(2,5-dichloro-4-sulfo-phynl)-3-methyl-5-pyrazolone. | Do. |
| 4 | ----do---- | 3-methyl-1-(5,7-disulfo-1-naphthyl)-5-pyrazolone. | Do. |
| 5 | ----do---- | 3-methyl-1-(4,8-disulfo-2-naphthyl)-5-pyrazolone. | Do. |
| 6 | 2,5-diaminobenzene-sulfonic acid. | 1-(2,5-dichloro-4-sulfo-phenyl)-3-methyl-5-pyrazolone. | Do. |

The dyes in this example and table may also be produced directly on the fiber, for instance by first fixing onto the fiber (by any of procedures A to C below) the condensation product of any of the above diamines with a dihalogen benzodiazine halide, then diazotizing on the fiber and developing with any of the above tabulated couplers.

*Example VI.—Metallized azo dye. Copper. By condensing with the intermediate*

4.6 parts of J acid (6-amino-1-naphthol-3-sulfonic acid) are stirred overnight with 5 parts of 1,4-dichloro-6-phthalazine-carbonyl chloride in 200 parts of water at pH 8, at room temperature. The condensation product is salted out, filtered off, washed with 5% NaCl solution and dried. The product thus prepared is dissolved in 200 parts of water, the solution is adjusted to pH 7.5 (with sodium bicarbonate) and then cooled to 15° C. This comprises the coupling component for the azo dye.

3.6 parts of 2-amino-1-phenol-4-sulfonic acid in 100 parts of water are diazotized at 5° C. in the usual manner with HCl and sodium nitrite. After a 1 hour period, the excess nitrite is destroyed. The pH of the solution is adjusted to 7.5 with sodium bicarbonate and the temperature is raised to about 10° to 20° C. This diazo solution is then added to the above basic solution of coupler, maintaining the pH at about 7.5 with solid sodium carbonate, and the temperature at 10° to 20° C. The coupling mass is allowed to warm to room temperature and is stirred for 48 hours at about pH 7.5.

*Metallization.*—To the resulting orange solution of the monoazo dye at 25° C. are added 3.05 parts of copper sulfate (CuSO₄) in 30 parts of water at pH 7. The rubine solution is stirred for 2 hours at 40° C. and salted to 8% (8 parts NaCl per 10 parts of solution) to give a rubine solid which is filtered off, rinsed and dried.

The dye thus obtained has the structure

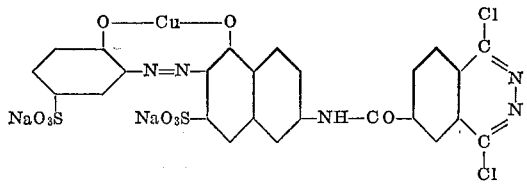

When applied to cotton fiber by fiber reactive procedure as discussed above, it gives a rubine shade of excelllent wash, light and bleach fastness.

*Example VII.—Metallized azo dye. Copper. By condensing with the metallized dye*

*Diazotization and coupling.*—3.6 parts of 2-amino-1-phenol-4-sulfonic acid in 100 parts of water are diazotized as in Example VI and coupled, at pH 9 to 10, to 4.6 parts of J acid in 200 parts of water. The pH is then adjusted to 6.5, and 2 parts of sodium acetate are added.

*Metallization.*—To the buffered solution thus obtained are added 3.05 parts of copper sulfate; the temperature is raised to 80° C. and is held for 1 hour. The resulting rubine solution is salted to 15% using NaCl, and the rubine solid is filtered off and washed with 50 parts of saturated salt solution.

*Condensation.*—The rubine solid from above is dissolved in 300 parts of water at 15° to 20° C. The pH is adjusted with sodium bicarbonate to pH 7 to 8, and is maintained at this value while the mass is condensed with 5.0 parts of 1,4-dichloro-6-phthalazine-carbonyl chloride. After stirring overnight at room temperature, the condensation is complete. The solution is salted to 8% NaCl concentration, and the rubine dye is filtered off, washed and dried as above. Its structure is the same as in part A of this example.

*Example VIII.—Metallized azo dye. Chromium*

*Diazotization and coupling.*—5.46 parts of 1-amino-6-nitro-2-naphthol-4-sulfonic acid are diazotized in 200 parts of water at 5° to 10° C. with HCl and NaNO₂. The temperature is allowed to warm slowly to 15° to 20° C., the excess nitrite is removed by aid of sulfamic acid, and the pH is adjusted to 7 with solid sodium formate. This is the diazo solution.

4.6 parts of J acid are dissolved in 100 parts of water, and the pH is adjusted to 9.3 by the addition 10 N Na₂CO₃ solution. This is the coupler solution.

The above diazo solution is added to the solution of coupler over a 1 hour period while maintaining the pH at 9 to 10. The coupling reaction is completed by continued stirring overnight at this pH.

*Metallization.*—The pH of the above solution of amino azo dye is now adjusted to 7.0 with 10 HCl. 2.0 parts of sodium acetate and 20 parts of a solution of sodium chromosalicylate containing 2.5% chromium are added. The solution is refluxed for 4 hours and results in a greenish gray solution.

*Condensation.*—The greenish gray solution is adjusted to pH 7 to 8 and maintained there with trisodium phosphate solution, while being reacted with 5 parts of 2,3-dichloro-6-quinoxaline-carbonyl chloride, at 40° to 50° C., overnight. The mass is now salted to 10% NaCl concentration; the gray solid is filtered off, washed with 25 parts of 10% NaCl solution and dried.

The gray solid, thus obtained corresponds to the formula

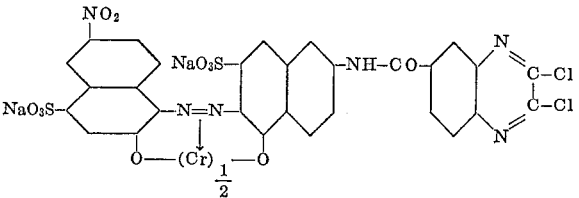

When dyed on cotton by the various application methods discussed above, it yields a greenish gray shade which has good light, wash and bleach fastness.

*Example IX.—Acid anthraquinone dye*

28 parts of 1-amino-4-(3-amino-4-sulfoanilino)-2-anthraquinone-sulfonic acid (prepared by the condensation of 1-amino-4-bromo-2-anthraquinone-sulfonic acid with 2,4-diaminobenzene-sulfonic acid) are dissolved in 3000 parts of water, and the pH of the solution is adjusted to 7.2 by the addition of a concentrated solution of trisodium phosphate. 15 parts of 2,3-dichloro-6-quinoxalinecarbonyl chloride are added to the blue solution, over a 3-hour period, at 35° to 45° C., while maintaining the pH at 7.5 to 8.5 by the addition of trisodium phosphate. The resulting thick slurry is allowed to cool to room temperature while stirring overnight. After salting with 300 parts of sodium chloride, the blue precipitate is filtered off, washed with 50 parts of a 4% sodium chloride solution, and dried in a vacuum desiccator below 60° C. The product is a sodium salt of the compound defined by the formula

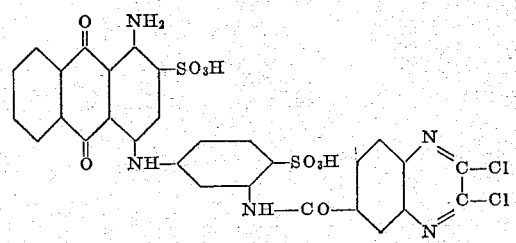

When applied to cotton fiber by the procedures of Examples A to C below, it produces bright blue dyeings of excellent fastness to light, washing and acid perspiration.

A dye of substantially the same shade and qualities is obtained if the quinoxaline compound in the above example is replaced by 15 parts of 1,4-dichloro-6-phthalazine-carbonyl chloride.

Example X 29.8 parts of 1-amino-4-(4-methylamino-3-sulfoanilino)-2-anthraquinonesulfonic acid (prepared by the condensation of 1-amino-4-bromo-2-anthraquinonesulfonic acid with 4-methylamino-3-sulfoaniline) are condensed as in Example IX with 15 parts of 2,3-dichloro-6-quinoxaline-carbonyl chloride. The product is recovered as in Example IX and constitutes a sodium salt of a compound defined by the formula

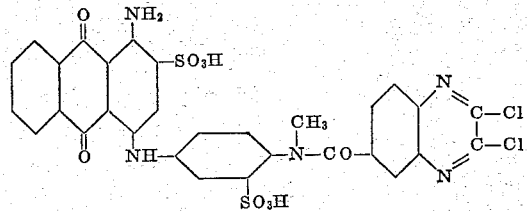

When applied to cotton by the procedures of Part III hereinbelow, this compound produces bright blue dyeing of excellent fastness to light, washing and acid perspiration.

Dyes of similar fastness qualities and of shades as indicated below are obtained if the procedure of Example IX is repeated with any of the following acid anthraquinone dyes as initial materials:

TABLE VI

| Item No. | Acid anthraquinone dye | Shade on cotton |
|---|---|---|
| 1 | 1-amino-4-(4-amino-3-sulfoanilino)-2-anthraquinone-sulfonic acid. | Green-blue. |
| 2 | 1-amino-4-(m-aminoanilino)-2,5-anthraquinone-disulfonic acid. | Do. |
| 3 | 1-amino-4-(3-amino-4-sulfoanilino)-2,5-anthraquinone-disulfonic acid. | Do. |
| 4 | 1-amino-4-(p-aminoanilino)-2,5-anthraquinone-disulfonic acid. | Do. |
| 5 | 1-amino-4-(4-amino-3-sulfoanilino)-2,5-anthraquinone-disulfonic acid. | Do. |
| 6 | 1-amino-4-[4-(4-amino-3-sulfophenyl)-2-sulfoanilino]-2-anthraquinone-sulfonic acid. | Do. |

Example XI.—Phthalocyanine dye

*Preparation of water-soluble copper phthalocyanine intermediate.*—5.76 parts of copper phthalocyanine are slowly added below 25° C. to 41 parts of chlorosulfonic acid. The solution is slowly heated to 130° C., and held for 3 hours, cooled, and drowned below 5° C. in an agitated mixture consisting of 100 parts of cold water, 300 parts of ice and 35 parts of sodium chloride. The solid is then filtered off and washed with 500 parts of 5% sodium chloride solution. This represents copper phthalocyanine polysulfonyl chloride press cake.

This press cake is now slowly added at pH 6 to 6.5 (maintained by the addition of sodium carbonate) to a solution of 4.34 parts of p-phenylenediamine in 40 parts of water. The turquoise solution is warmed and agitated at 60° C., until the pH remains constant. The reaction mass is then cooled and salted to 20% salt concentration by addition of sodium chloride. The solid is filtered off and washed with 100 parts of 15% salt solution. It constitutes a compound of the formula

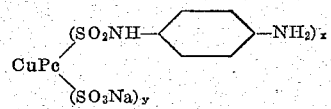

wherein $x$ and $y$ are average numbers of which $x$ is not less than 1, $y$ is not less than 2, and the sum of the two is between 3 and 4, while CuPc represents a molecule of copper phthalocyanine less $(x+y)$ H-atoms.

*Condensation.*—The filter cake obtained above is dissolved in 200 parts of water, the pH is adjusted to about 7.5 to 8 by addition of sodium bicarbonate, the temperature is raised to about 40° to 50° C. and 5.2 parts of 2,3-dichloro-6-quinoxaline-carbonyl chloride are added. The condensation is allowed to proceed for 12 to 15 hours under agitation at said temperature. The solution is salted to 15% sodium chloride. The resulting turquoise dye is filtered off, washed with 50 parts of 20% salt solution and dried.

The dried cake represents a compound of the formula hereinabove, but wherein at least some of the $$-SO_2NH-\langle\rangle-NH_2$$

groups have been replaced by side-chains of the formula

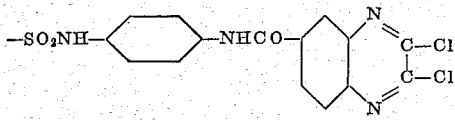

When applied to cotton by the methods outlined above, it affords bright turquoise shades that are fast to washing and to light.

Similar results as in the above example may be obtained by starting with a sulfuric acid-stable metal phthalocyanine, such as nickel or cobalt phthalocyanine, in lieu of copper phthalocyanine. Also, by changing the nature of the diamine selected, the quantity thereof, and the conditions of chlorosulfonation, phthalocyanine compounds of the general formula

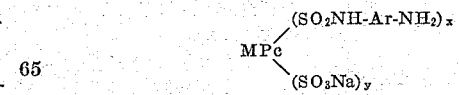

may be obtained and used as initial dye for condensation with dihalogeno-benzodiazine-carbonyl halides. In this formula, $x$ and $y$ are average numbers adding up to between 2 and 4 (each being at least 1); MPc represents a metal phthalocyanine which is stable in the chlorosulfonation reaction (for instance, nickel or cobalt phthalocyanine), while Ar may represent miscellaneous substituted phenylene diamines, benzidines or diaminostilbenes, as typified by the following table.

TABLE VII 2,5-diaminobenzene-sulfonic acid;
N-methyl-p-phenylenediamine;
N-2-hydroxyethyl-p-phenylenediamine;
N-2-cyanoethyl-p-phenylenediamine;
N-2-sulfatoethyl-p-phenylenediamine;
5-amino-2-ethylaminobenzene-sulfonic acid;
4,4'-diamino-3,3'-biphenyl-disulfonic acid;
5-amino-2-n-propylamino-benzenesulfonic acid;
4,4'-diamino-2,2'-biphenyl-disulfonic acid;
4,4'-diamino-2,2'-stilbene-disulfonic acid;
m-Phenylenediamine;
2,4-diaminobenzene-sulfonic acid;
N-methyl-m-phenylenediamine;
N-(2-hydroxyethyl)-m-phenylenediamine;
N-isobutyl-m-phenylenediamine;
4-amino-2-methylamino-benzenesulfonic acid;
4-amino-2-n-butylamino-benzenesulfonic acid;
Toluene-2,5-diamine;
Toluene-2,4-diamine.

Similar results are obtained further by using in lieu of the sulfamido-arylamino-substituted phthalocyanines above formulated, phthalocyanine compounds which bear amino groups on an aliphatic side-chain, for instance the compound

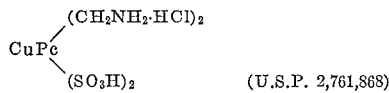

(U.S.P. 2,761,868)

Example XII

Copper phthalocyanine polysulfonyl chloride press cake, obtained as in Example XI from 5.76 parts of copper phthalocyanine, is slurried at pH 6 and 40° C. in 150 parts of water containing 4.1 parts of the condensation product of 2,4-diamino-benzenesulfonic acid with 2,3-dichloro-6-quinoxaline-carbonyl chloride (prepared as in Example V). After four hours stirring at this temperature and pH, the blue solution is salted, and the dye is filtered off and dried. It constitutes a sodium salt of the dye represented in the free acid form by the formula

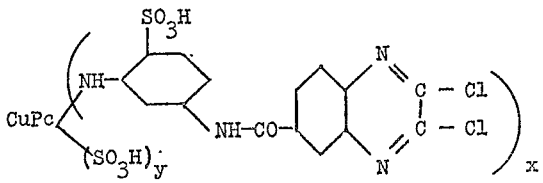

wherein $x$ and $y$ are average numbers of which $x$ is not less than 1, $y$ is not less than 2, and the sum of the two is between 3 and 4. When applied to cotton by the methods of Part III hereinbelow, this dye produces bright turquoise shades, which are fast to washing and to light.

In lieu of 2,4-diamino-benzenesulfonic acid in the above condensation, other arylene diamines may be used, for instance, p-phenylene diamine, m-phenylene diamine, or 2,5-diaminobenzene-sulfonic acid.

PART III.—APPLICATION TO FIBER

*One-pad procedure.*—Cotton fabric is padded with a solution of dye, urea and sodium carbonate and/or sodium bicarbonate. The padding is cured by drying and heating at 390–425° F. for 30 seconds or more, thereafter cooled, rinsed, scoured, rinsed and dried. The urea may be eliminated from the dye bath without changing the quality of the dyeing.

Specific examples illustrating this process are as follows:

Example A 30 parts of the yellow dye of Example I are dissolved in 1000 parts of water containing 10 parts of sodium carbonate. This solution is padded onto cotton broad cloth at 65% pick-up, the fabric is dried in a flue dryer, passed for 45 seconds through a 390° F. oven, washed (hot water rinse, cold water rinse, hot soap scour, hot water rinse and cold water rinse) and dried. There results a bright yellow shade which is fast to washing and light.

When 200 parts of urea are added to the dye bath, a dyeing of equal shade, strength and fastness results.

Example B

One part of the dye of Table VI, item No. 3, is dissolved in 1000 parts of water containing 10 parts of sodium bicarbonate and 50 parts of urea. This solution is padded onto cotton twill at 85% pick-up, the fabric is frame dried, passed for 90 seconds through a 425° F. oven, washed and dried. There results a light blue dyeing which is fast to washing and light.

When the urea is omitted from the dye bath, a dyeing of equal shade, strength and fastness results.

Example C 10 parts of the dye of Example III, paragraph C, are dissolved in 1000 parts of water containing 20 parts of sodium carbonate. This solution is padded onto a 65:35 blend of polyester fiber:cotton, the fabric is dried on a can dryer, passed for 90 seconds through a 400° F. roller-type curing oven, washed and dried. There results a bright red dyeing which is fast to washing and light.

When a disperse dye such as "Latyl" die is added to the dye bath of this process, one gets simultaneous dyeing of the "Dacron" and the cotton.

Example D 50 parts of the dye of Example XII are dissolved in 1000 parts of water containing five parts of sodium carbonate and 15 parts of sodium bicarbonate. This solution is padded onto cotton poplin, the fabric is dried with an infra-red predyer, padded for 60 seconds through a 390° F. curing oven, washed and dried. There results a bright turquoise dyeing which is fast to washing.

Example E—Printing

When disperse dyes and the fiber-reactive dyes disclosed herein are formulated together in printing compositions containing acid acceptor selected from the group of alkali metal carbonates and bicarbonates, and the printing composition is applied to fabrics of blended polyester and cotton fibers, followed by development according to the process of the present invention, one obtains prints which exhibit outstanding colorations of both fibers.

A printing composition consisting of:

| | Parts |
|---|---|
| Monochloro-4,8-diaminoanthrarufin, finely dispersed | 30 |
| The dye of structure shown in Example X | 20 |
| "Keltex"—sodium salt of alginic acid (Kelco Co., Clark, N.J.) | 20 |
| Urea | 100 |
| m-Nitrobenzenesulfonic acid, sodium salt | 10 |
| Sodium bicarbonate | 20 |
| Water | 800 |
| Total | 1000 | is printed onto fabric consisting of a 65:35 blend of "Dacron" polyester fiber and cotton. The fabric is dried, passed for 90 seconds through a 400° F. curing oven, rinsed in cold water then in hot water, washed in a hot solution of nonionic detergent followed by a dilute (0.1%) acetic acid rinse, rinsed in water, and dried. The fiber components of the fiber blend are dyed in blue shades which are fast to washing and to light.

If desired, the "Keltex" thickener used in the present example may be replaced by other thickeners such as methylcellulose, starch ethers and the like. Also, the sodium bicarbonate may be replaced by sodium carbonate.

It is to be understood that any of the dyes in the above Examples I to XII or prepared from the intermediates in Tables I to VII can be used in any of the procedures shown in Examples A to E to give essentially the same results.

It will be understood that the details of the above examples may be varied widely without departing from the spirit of the invention.

For instance, in lieu of the 2,3-dichloro-6-quinoxaline-carbonyl chloride wherever named in the above examples, the stoichiometric equivalent of any of the following diazines may be used:

2,3-dichloro-5-quinoxaline-carbonyl chloride;
1,4-dichloro-6-phthalazine-carbonyl chloride;
1,4-dichloro-5-phthalazine-carbonyl chloride;
2,3-dibromo-6-quinoxaline-carbonyl bromide;
1,4-dibromo-6-phthalazine-carbonyl bromide.

The azo dyes named in Examples I and II, may be replaced by theoretically equivalent quantity of any azo dye having the requisite water-solubility by virtue of possessing sulfo and/or carboxy groups and having an acylatable amino group. Likewise, the diazo components and coupling components named in Examples III and IV may be replaced by theoretically equivalent quantities of any combination of a diazo component and a coupling component which will result in a dye having the requisite water-solubility. Some alternatives have been specifically named in the mentioned examples. Others worthy of special consideration, because they are readily available or lead to desirable shades, are indicated in the following tables of diazo components and coupling components and by the azo dyes which result from coupling these in various combinations from these tables or with the coupling components or diazo components, respectively, named in Examples I to V:

Alternative coupling components: m-Anisidine, N-ethylaniline, N-ethyl-m-toluidine, N-n-propyl-m-toluidine, 3'-aminoacetanilide, 5-amino-2-naphthalenesulfonic acid, 1-naphthol-3,6,8-trisulfonic acid, 5-amino-1-naphthol-3-sulfonic acid, 6-ethylamino-1-naphthol-3-sulfonic acid, 6-amino-1-naphthol-3,5-disulfonic acid.

Alternative diazo components:
    4-amino-2,7-naphthalene-disulfonic acid,
    7-amino-1,3-naphthalene-disulfonic acid,
    p-Aminophenyl-1,2-naphthotriazole-3,6,8-trisulfonic acid,
    2-(4-amino-3-sulfophenyl)-6-methyl-7-sulfobenzothiazole,
    2-acetamido-4-amino-benzenesulfonic acid,
    3-acetamido-6-amino-benzenesulfonic acid,
    2-benzamido-4-amino-benzenesulfonic acid,
    Metanilic acid,
    Sulfanilic acid.

Alternative diazo-azo components:
    4-amino-4'-nitro-2,2'-stilbenedisulfonic acid→1-naphthol-3,6,8-trisulfonic acid (and reduction of the 4'-nitro group to an amino group);
    2-amino-p-benzenedisulfonic acid→5-amino-2-naphthalenesulfonic acid;
    Sulfanilic acid→orthanilic acid;
    2-amino-4-nitrobenzene-sulfonic acid→cresidine;
    3-amino-1,5-naphthalene-disulfonic acid→cresidine.

In Example V, any of the diamines there named may be replaced by m-phenylene-diamine or p-phenylene-diamine, while the coupling components may be replaced by any of the alternatives named hereinabove as well as by 6- or 5-acetamido-1-naphthol-3-sulfonic acid,
8-acetamido-1-naphthol-3,6-disulfonic acid,
8-benzamido-1-naphthol-3,6-disulfonic acid,
7-amino-1-naphthol-3,6-disulfonic acid,
6-amino-1,3-naphthalenedisulfonic acid,
2-naphthol-3,6-disulfonic acid or
3-amino-2,7-naphthalenedisulfonic acid.

In Examples VI, VII and VIII, the metallizing agents (Cu and Cr) may be interchanged or they may be replaced by reagents which will introduce nickel or cobalt as metal into the azo dye. The latter itself (in each example) may be replaced by other metallizable azo dyes, for instance, any of the following:

2-amino-1-phenol-4-sulfonic acid, diazotized and coupled to:
    7-amino-1-naphthol-3-sulfonic acid, or to
    6-methylamino-1-naphthol-3-sulfonic acid, or to
    8-amino-1-naphthol-3,6-disulfonic acid;
2-amino-1-phenol-4,6-disulfonic acid → 6-amino-1-naphthol-3-sulfonic acid;
2-amino-1-phenol-5-sulfonic acid→6-(3-amino-4-sulfoanilino)-1-naphthol-3-sulfonic acid;
2-amino-4-methyl-1-phenol-5-sulfonic acid→6-amino-1-naphthol-3-sulfonic acid;
2-amino-4-sulfobenzoic acid→6-amino-1-naphthol-3-sulfonic acid;
2-amino-6-nitro-1-phenol-4-sulfonic acid→6-(4-amino-3-sulfoanilino)-1-naphthol-3-sulfonic acid;
2-amino-6-nitro-1-phenol-4-sulfonic acid→3-methyl-1-(p-sulfophenyl)-5-pyrazolone (and reduction of the nitro group to an amino group);
2-amino-5-nitrobenzoic acid→3-methyl-1-(p-sulfophenyl)-5-pyrazolone (and reduction of the nitro group to an amino group);
1-amino-6-nitro-2-naphthol-4-sulfonic acid→8-amino-1-naphthol-5-sulfonic acid;
1-amino-6-nitro-2-naphthol-4-sulfonic acid, diazotized and coupled to:
    2-naphthol-6-sulfonic acid or
    3-methyl-1-(m-sulfophenyl)-5-pyrazolone, and followed in each instance by reduction of the nitro group to an amino group.

In Examples IX and X, the acid anthraquinone dyes named there may be replaced by any other dyes of this class, for instance any one of the following:

1-amino-4-(3-methylamino-4-sulfoanilino)-2-anthraquinonesulfonic acid;
1-amino-4-(3-amino-2-methyl-5-sulfoanilino)-2-anthraquinonesulfonic acid;
1-amino-4-(m-aminoanilino)-2,6- or 2,8-anthraquinone-disulfonic acid;
1-amino-4-(p-aminoanilino)-2,3-, 2,6- or 2,8-anthraquinone-disulfonic acid;
1-amino-4-(3-amino-4-sulfoanilino)-2,6- or 2,8-anthraquinone-disulfonic acid;
1-amino-4-(4-amino-3-sulfoanilino)-2,6-anthraquinone-disulfonic acid;
1-amino-4-(p-n-butylamino-anilino)-2,6-anthraquinone-disulfonic acid;
1-amino-4-(p-beta-hydroxyethylamino-anilino)-2,5-anthraquinone-disulfonic acid;
1-amino-4-(p-beta-cyanoethylamino-anilino)-2,3-anthraquinone-disulfonic acid;
1-amino-4-(p-beta-sulfatoethylamino-anilino)-2,3-anthraquinone-disulfonic acid;
1-amino-4-(3-carboxy-4-methylaminoanilino)-2,6-anthraquinone-disulfonic acid;
1,4-bis(4-amino-3-sulfoanilino)-anthraquinone;
1-amino-4-(2-carboxyanilino)-3-anthraquinone-sulfonic acid;
1-amino-4-[p-(4-amino-3-sulfophenyl)anilino]-2,5-anthraquinone-disulfonic acid;
1-amino-4-[4-(4-amino-2-sulfophenyl)-3-sulfoanilino]-2-anthraquinonesulfonic acid;
1-amino-4-[4-(4-amino-2-sulfostyryl)-3-sulfoanilino]-2-anthraquinonesulfonic acid;
4,8-bis(4-amino-3-sulfoanilino)-1,5-dihydroxy-2,6-anthraquinone-disulfonic acid;
1-amino-4-[p-(4-amino-2-sulfophenylazo)anilino]-2,5-anthraquinone-disulfonic acid.

The acid-anthraquinone dye of formula

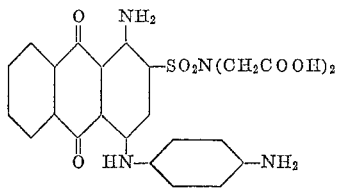

The acid anthrapyrimidine dye of formula

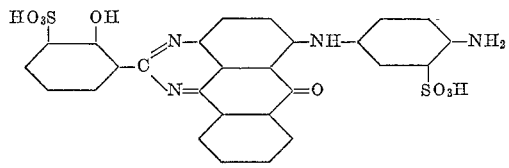

In the salting out step in each example, the quantity of salt employed may vary widely, and this can be readily determined by observing the volume or rate of precipitation of the dye. In some instances, where the solid dye product separates readily on cooling, the salting step may be omitted altogether.

The salted out dye in any of the examples may be converted into free $SO_3H$ form by acidification and the latter may then be converted into water-soluble salts by treatment with customary, water-soluble bases, for instance, NaOH, KOH, ammonium hydroxide or water-soluble organic amines.

In selecting the dye chromophore, it may be well to observe that those compounds wherein the R in the $$\begin{matrix} NH \\ | \\ R \end{matrix}$$

group is an alkyl radical of 1 to 4 C-atoms and wherein the remainder of the dye molecule is free of OH, NH and $NH_2$ groups, generally lead to fiber reactive dyes which possess high fastness to bleach, in addition to good light- and wash-fastness. (See Example II and Table II above.)

In lieu of the acid acceptors for the condensation reaction named in the specific examples (i.e. sodium bicarbonate or trisodium phosphate), other bases may be employed, such as sodium hydroxide, potassium carbonate, sodium acetate, ammonium hydroxide and the like. The pH for this reaction is not particularly critical, the operable range being approximately between pH 4 and 10, and the preferred range being about pH 7 to 9.

In the application of the dye to the fiber, the alkalizing treatment may be achieved by any commonly used acid acceptor, for instance sodium or potassium carbonate, an alkali-metal hydroxide, alkali-metal bicarbonates or phosphates, diammonium phosphate, benzyl trimethyl-ammonium hydroxide, and the like.

Other permissible variations will be readily obvious to those skilled in the art.

The majority of the reactive dyes of this invention are characterized by high percentage fixation and high rate of fixation on cellulosic fiber; they also possess alkaline stability, which implies little if any loss by decomposition in the pad bath treatment.

By acid anthraquinone coloring matters we mean any water-soluble anthraquinone coloring compound, particularly those which are normally used as acid wool colors. See, for instance, H. A. Lubbs, "The Chemistry of Synthetic Dyes and Pigments," Chapter on Anthraquinone Acid Dyes, pages 390 to 417, inclusive.

By water-soluble phthalocyanine coloring matters, we mean compounds having the fundamental macrocyclic structure of a metal phthalocyanine, for instance that of $Cu[C_6H_4(CN)_2]_8$, bearing sufficient water-solubilizing groups to solubilize the compound to the extent needed in a dyebath, as above indicated.

By anionic dye chromophore we mean a dye which bears anionic water-solubilizing radicals such as sulfo or carboxy.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for dyeing cellulosic fibers with a fiber-reactive dye containing a 2,3-dichloro-6-quinoxalinecarbonylamino group, which process consists essentially of the following steps:
    (A) the cellulosic fiber is padded with said fiber-reactive dye from a solution consisting essentially of from 0.1 to 60 parts of said dye and from 10 to 20 parts of an acid acceptor selected from the group consisting of sodium carbonate and sodium bicarbonate, per 1000 parts of water at ambient temperature;
    (B) the resulting dye-padded fiber is then dried followed by heating for 45 to 90 seconds at from 390° to 425° F.; and
    (C) washing the resulting dyed fiber of step B.

2. A process according to claim 1, which process utilizes from 50 to 200 grams per liter of urea in the pad bath.

3. A process for dyeing and printing fabrics, said fabrics consisting essentially of cellulosic and polyester fibers, in which process a member selected from the group consisting of a printing composition and a padding solution is applied to said fabric, said printing composition and said padding solution containing a member selected from the group consisting of an alkali-metal carbonate and an alkali-metal bicarbonate, a disperse dye and a dye containing a 2,3-dichloro-6-quinoxalinecarbonylamino group, followed by drying and heating the treated fabric for 45 to 90 seconds at a temperature of from 390° to 425° F., and washing the resulting dyed fabric.

References Cited by the Examiner

UNITED STATES PATENTS

| | | | |
|---|---|---|---|
| 1,886,480 | 11/32 | Haller et al. | 8—54.2 X |
| 3,043,650 | 7/62 | Wegmann et al. | 8—1.20 |
| 3,082,052 | 3/63 | Booth et al. | 8—54.2 |

FOREIGN PATENTS

| | | |
|---|---|---|
| 315,451 | 7/29 | Great Britain. |
| 1,247,660 | 10/60 | France. |

NORMAN G. TORCHIN, *Primary Examiner.*